March 2, 1937.  G. WALTHER ET AL  2,072,661

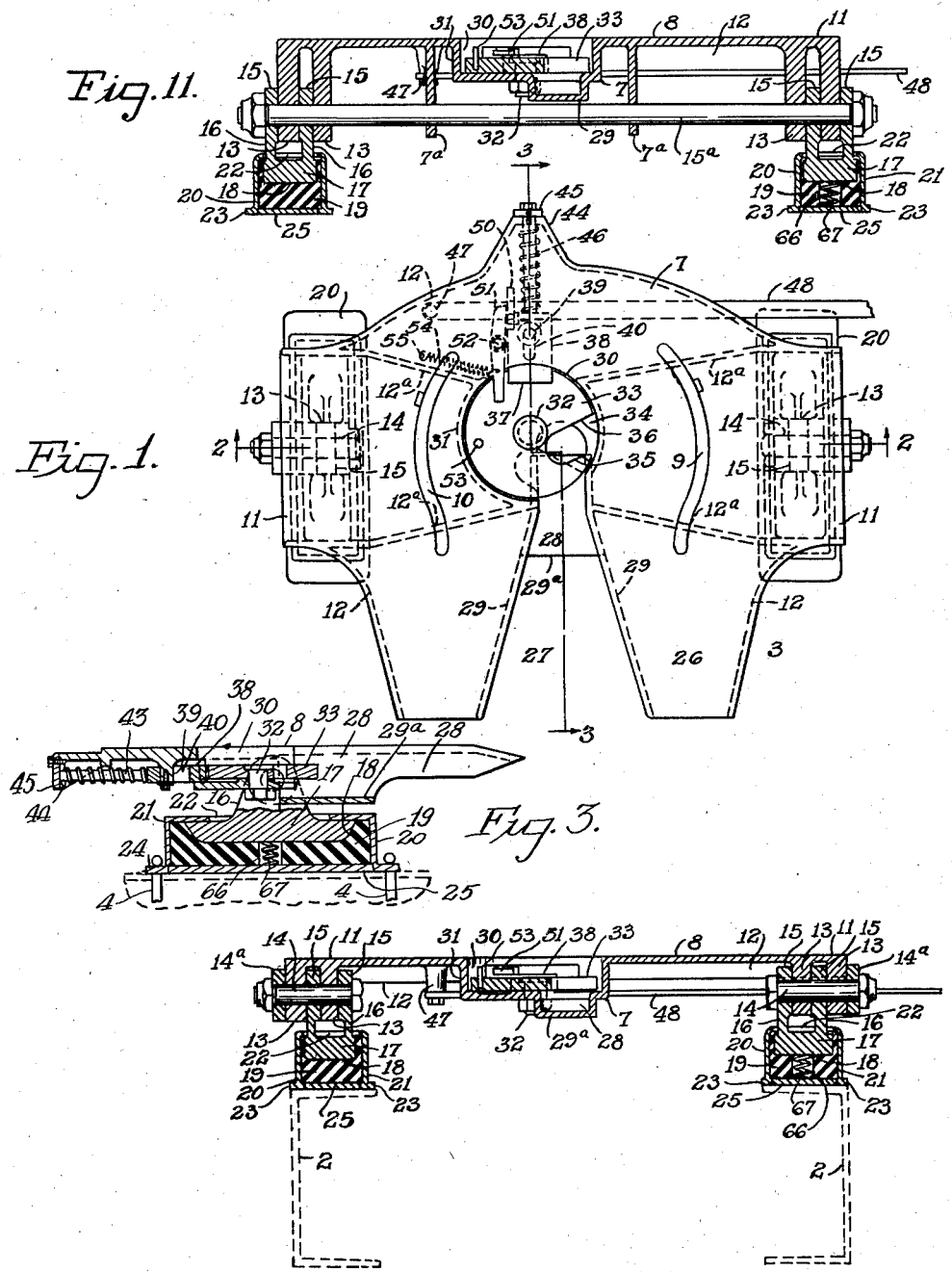

FIFTH WHEEL

Filed Jan. 8, 1934   2 Sheets-Sheet 2

INVENTORS,
George Walther and Elmer L. Miller.
BY Howard P. Smith
Their ATTORNEY Patented Mar. 2, 1937

2,072,661

UNITED STATES PATENT OFFICE 2,072,661

FIFTH WHEEL

George Walther, near Dayton, and Elmer L. Miller, Dayton, Ohio, assignors to The Dayton Steel Foundry Company, Dayton, Ohio, a corporation of Ohio Application January 8, 1934, Serial No. 705,726

2 Claims. (Cl. 280—33.1)

This invention relates to new and useful improvements in a tractor semi-trailer fifth wheel, and more particularly to a resiliently mounted fifth wheel structure including a positively controlled disengaging means for the trailer unit fifth wheel member.

A principal object of this invention is to provide for a fifth wheel structure, a novel resilient mounting including fixed rubber blocks in which all the rubber is used to support the superimposed weight, thereby efficiently eliminating shock to the power plant of the tractor, injury to the contents of the trailer and noise incident to the vibration of the mounting means.

Another principal object of our invention is to provide positive locking means for retaining the king pin in engagement with the fifth wheel structure.

It is still another object of the invention to provide release means in combination with the locking means, to permit an easy one-man operation of the tractor and trailer when coupling or uncoupling the latter.

It is yet another object of this invention to provide simple means for adjusting the transverse position of the supporting brackets to accommodate tractor channel frames of varying widths.

Another object of our invention is to provide an electrical insulated connection between the tractor and the trailer, through the rubber mounting means in the fifth wheel construction.

Other important objects of this invention will be set forth in the following specification and in the claims annexed thereto.

Figure 4:
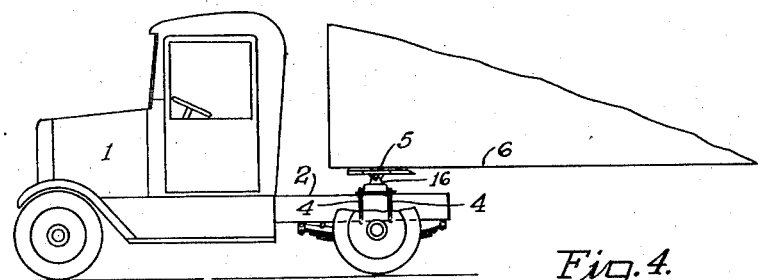
Figures 8, 9, 10:
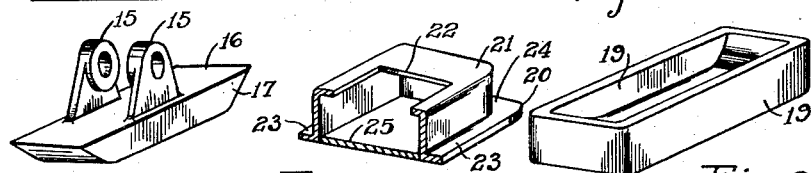
Figure 5:
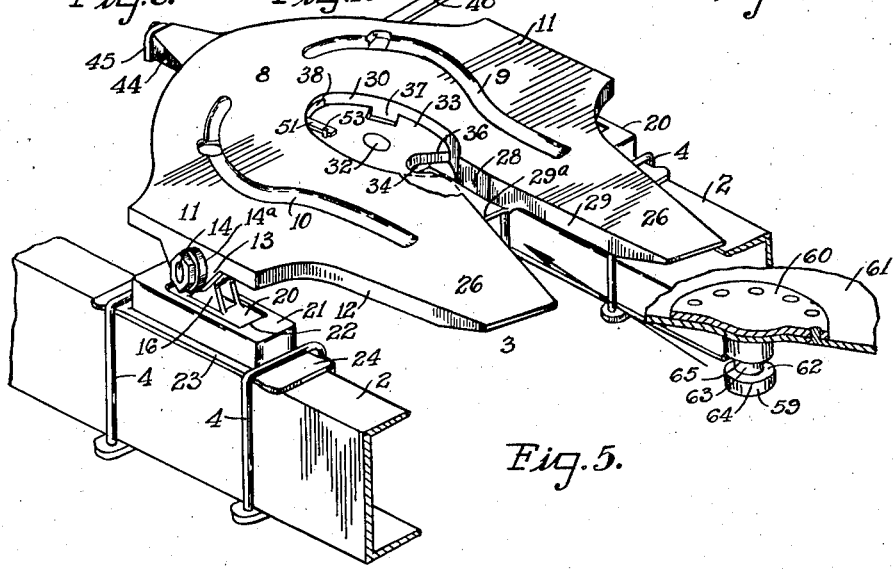
Figure 7:
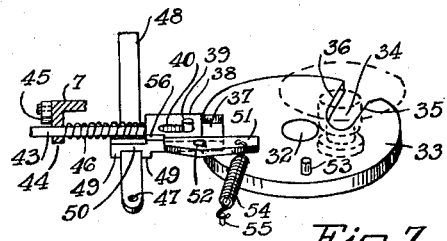
Figure 6:
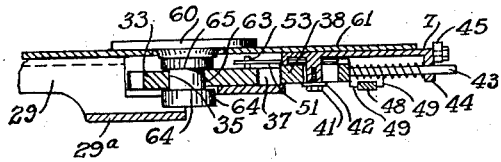

In the accompanying drawings illustrating our invention in its preferred form, Figure 1 is a top plan view of our fifth wheel structure as applied to a tractor. Figure 2 is a transverse section through the fifth wheel structure taken on the line 2—2 of Figure 1. Figure 3 is a longitudinal section through the fifth wheel structure, and taken on the line 3, 3, 3, 3 of Figure 1. Figure 4 is a side view of a tractor and trailer, partially broken away, and showing our fifth wheel structure employed with the two vehicles. Figure 5 is a perspective view of our improved fifth wheel structure. Figure 6 is a detail view, in section, showing the king pin in engagement with the fifth wheel structure. Figure 7 is a detail view, in perspective, of the locking device. Figure 8 is a perspective view of one of the swivel brackets. Figure 9 is a perspective view of one of the cushions for the swivel brackets. Figure 10 is a fragmentary perspective view of one of the cushion frames for attachment to the tractor chassis. And Figure 11 is a sectional view taken through a modified form of base and connecting shaft for the fifth wheel structure.

Referring now to the accompanying drawings for a detailed description of our invention, the numeral 1 designates a conventional tractor unit to whose rearwardly extending channel frame 2 our improved fifth wheel structure 3 is secured by means such as U bolts 4 substantially above the rear axle of the tractor. (See Figure 4). A king pin 5 is secured to the under side of a trailer or semi-trailer body 6 in a position to depend therefrom on the longitudinal axis adjacent its forward end.

Our improved fifth wheel structure comprises a base 7 having substantially a smooth top surface 8 with oppositely disposed oil grooves 9 and 10 formed therein. The base 7 has formed integral therewith opposite lateral projections 11, 11 reinforced by a peripheral flange 12 encompassing the base 7, and radial ribs 12ª projecting toward the center of the latter. (See Figures 1 and 2).

Depending from each of the projections 11 are spaced, apertured pivot members 13, 13, pivotally connected by a stud 14 with similarly spaced pivot arms 15, 15. The latter are supported by, and project above, the top of a swivel bracket 16 positioned at each side of the base 7. These pivoted connections provide a horizontal axis disposed transversely of the tractor and permit the base 7 to assume an inclined position when disengaged from the trailer, thus facilitating the coupling and uncoupling of the latter. Furthermore, such a pivotal connection relieves all bending stresses in the king pin 5 and its related parts when the tractor and trailer pass over uneven ground. (See Figures 1, 2 and 4).

Each swivel bracket 16 is provided with a rectangular base 17, whose opposite ends are beveled inwardly toward the lower face of said base. This base is then received by a close-fitting aperture 18 in the top face of a pre-moulded resilient block 19, such as rubber, and whose walls totally encompass the block, except its top face on which the arms 15, 15 are formed. The blocks 19, 19 are positioned below the swivel brackets 16, 16, each bracket 16 being maintained in engagement with its respective block by a surrounding frame or saddle 20 in which the block is tightly fitted.

Each saddle 20 comprises a closed rectangular casing 21 provided with an opening 22 in its top face, substantially large enough to permit a relatively free movement in any direction of the arms 15, 15 that project through it. (See Figures 2, 3, 5, 8, 9 and 10).

Adjacent its lower face the saddle 20 has narrow side flanges 23, 23 and a wide flange 24 at each end thereof. These end flanges 24, 24 are engaged by the U bolts 4 when the saddles are positioned on the top of the tractor channel frames 2 for attachment to the latter. (See Figures 1, 2, 5, 8, 9, and 10).

The base 7, when pivotally mounted on the swivel brackets 16, 16 and cushioned as previously described, will be yieldable in any direction to effectively minimize all shocks or vibrations induced in the structure. The resilient blocks 19, 19 are introduced to their respective saddles 20 through an opening provided in its lower face for that purpose. This opening is then closed by a flat plate 25 welded or otherwise secured in place before assembling on the chassis. (See Figures 2, 3 and 10). Each rubber block 19 is entirely below the weight which it carries, so that all the rubber may be utilized to support this weight.

The base 7 is elongated rearwardly in a wide converging portion 26 that has a centrally disposed longitudinal V-shaped opening 27 which is formed at its inner end with a constricted passage 28 through which the king pin 5 passes to the locking means. The opposite sides of the opening 27 are reinforced by ribs 29, 29 formed beneath its edges and projecting toward the center of the base where their lower edges are united by a horizontal wall 29ª below the passage 28. (See Figures 2 and 5.)

Substantially at the center of the base 7, but offset laterally with respect to the passage 28, is a circular recess 30 with whose confining side wall 31 the ribs 12ª and 29 are joined. Rotatably mounted on a stud 32 in the bottom of the recess 30, is a lock disc 33, below the face 8 of the base and intercepting the inner end of the passage 28. The wear of the lock disc is distributed to all parts of the surface of the wall of the recess 30 which confines it; and if the stud 32 should break, the recess would still hold the disc.

Formed in the periphery of the disc 33 is a king pin retaining recess 34 whose rearward confining wall 35 forms a hook-shaped projection of the disc to retain the king pin therein when the disc is rotated to that position shown by the solid lines in Figure 1.

When turned to the dotted line position shown in Figure 1, the opposite straight side 36 of the recess 34 will be engaged by the king pin 5 as it advances through the passage 28, for rotation by said king pin to the full line position shown in Figures 1, 6 and 7. When in this position a wide recess 37, also formed in the periphery of the disc 33, will be engaged by a spring tensioned lock plunger 38, oppositely disposed to the passage 28, to prevent a counter movement of the disc, which thus retains the king pin 5.

The plunger 38 is slidably mounted on a boss 39 formed on the underside of the base 7, said boss entering an elongated slot 40 in the plunger. A bolt 41 and washer 42 retain the plunger in position on the boss 39.

The opposite end of the plunger 39 has welded or otherwise attached thereto a guide rod 43 positioned radially with respect to the disc 33 and supported at its outer free end in an aperture formed in a bracket 44 projecting from the forward flange 12 on the base 7. Movement of the rod 43 is arrested by a safety latch 45 pivotally secured to the face of the bracket 44 and actuated by gravity to drop in front of the aperture for the rod, thus preventing its outward movement except when it is purposely raised by the operator. (See Figures 1, 3, 6 and 7.)

In order to withdraw from the recess 37 in the disc 33, the plunger 38, which is forced toward the disc by a compression spring 46 surrounding the guide rod 43 between the former and the projection 44, we have provided the following means. Yieldably attached to a boss 47 on the underside of the base 7, is a release bar 48 projecting transversely beneath the base 7 and projecting a sufficient distance to be reached by the operator. This bar 48 is received between fingers 49, 49 formed on an arm 50 at the outer end of the plunger, so that when the free end of the release bar is moved toward the tractor, the plunger 38 will be withdrawn from the recess 37 in the disc 33. (See Figures 1, 6 and 7).

When the plunger is withdrawn from the recess 37, the following means will prevent its re-entrance under the influence of the spring 46. Adjacent one side of the plunger 38 we have positioned a latch finger 51 which is pivoted at its center on a boss 52 formed on the underside of the base 7.

One end of the latch finger 51 projects over the periphery of the disc 33 into the path of a release pin 53 projecting axially from the outer face of the latter. Also secured to this end of the latch finger is a tension spring 54 whose other end is secured to a pin 55 fixed in the base 7. This spring 54 will cause the opposite end of the latch finger 51 to bear against a stop 56 provided on the top face of the plunger 38. Now, when the plunger 39 is withdrawn from the recess as previously described, the stop 56 will be withdrawn beyond the end of the latch finger 51, and the spring 54 will cause said finger to rotate sufficiently to engage the stop 56 and prevent the re-entry of the plunger 38 into the recess. (See Figures 1, 3, 6 and 7).

By this mechanism the truck operator may, single handed, release the lock plunger 38 from engagement with the recess 37, permitting a free revolution of the disc 33. The operator may then disengage the tractor from the trailer without the assistance of another person.

When the king pin 5 is withdrawn from the recess 34, the disc 33 will be rotated clockwise, and this rotation will cause the release pin 53 to engage the inner end of the latch finger 51 and force its opposite end out of engagement with the stop 56 on the plunger 38.

After the plunger 38 is thus released the spring 54 will cause it to ride on the periphery of the disc 33 until it is rotated in a reverse direction by the re-entry of a king pin 5 into the recess 34. This will again bring the recess 37 into alinement with the plunger for engagement by it (See Figure 5.)

The king pin 5 employed with our improved fifth wheel structure, consists of a cylindrical shank 59 integral with a circular top plate 60. This plate is intended to be riveted or otherwise secured to the top surface of an extended plate 61 that is secured to the underside of the trailer body 6 and essentially at its front end. When thus attached to the trailer body, the stresses incident to operation with a tractor are uniformly communicated to the trailer body.

The cylindrical shank 59 beneath the plate 61 has therein an annular recess 62 forming a reduced shoulder 63. The diameter of this shoulder is slightly less than the width of the recess 34 in which it is received. When thus positioned in the recess 34 of the disc 33, the king pin 5 is arrested against axial movement by the adjacent shoulders 64 and 65 formed by the larger shank 59 above and below the disc 33. (See Figures 5 and 6).

When the trailer is connected with a tractor, the king pin 5 is guided in the direction indicated by the arrow in Figure 5 into proper registry with the disc 33, by the sliding engagement of the smooth lower face of the plate 61 with the flat top 8 of the base 7, such sliding engagement being facilitated by the lubrication supplied from the grooves 9 and 10. (See Figure 5).

When it is desired to attach our improved fifth wheel structure to a tractor having a wider frame spacing than that relatively shown in Figure 2, the bolts 14, 14 may be removed and the swivel brackets 16, 16 re-attached, with the inner arm 15 of each positioned between the spaced apertured members 13, 13, instead of the outer arm 15 as shown in Figure 11. The washers 14a, when removed, need not be reapplied. Thus we can accommodate our fifth wheel structure to tractors of different widths without changing the bolts or rocker pins 14.

As one way of utilizing one of the rubber blocks 19 as an insulator for a continuous electrical ground connection between the semi-trailer and the vehicle, we have formed in that block a through hole 66. Fitted in this hole is a compression contact spring 67 which is continuously in contact at its top and bottom with the bracket member base 17 and the plate 25 respectively, to provide an electrical ground through them for the trailer lights (not shown).

In Figure 11 we have not only shown how the fifth wheel structure is attached to a tractor having a wider frame spacing, but a base 7 whose pivot members 13, 13 are connected to the pivot arms 15, 15 of the bracket members 16, 16 by a through shaft 15a instead of the rocker pins 14. Projecting downwardly from the central portion of the inner surface of the base plate 8, one on each side of its center line, are bracket arms 7a, 7a through holes in the lower ends of which the shaft 15a passes to assist in supporting the middle portion of said base.

Having described our invention, we claim:

1. In a fifth wheel for connecting a semi-trailer to a vehicle, a flat base member pivotally secured to said vehicle, said base member formed with a central circular recess from which a passage extends, a lock disc rotatable in said recess and formed with a peripheral slot and a peripheral recess in spaced relation, a king pin projecting downwardly from the semi-trailer for entrance into the peripheral slot in the disc through the passage in the base, a spring-pressed bolt adapted to engage in the peripheral recess in the disc to lock the latter after it is rotated by the king pin, a hand-operated member for withdrawing said bolt from the recess in the disc, automatic means for holding said bolt in its retracted position, and means carried by the lock disc for engagement with the automatic bolt holding means to release the bolt for contact with the periphery of the disc after the peripheral recess therein has been moved beyond the bolt.

2. In a fifth wheel for connecting a semi-trailer to a vehicle, a flat base member pivotally secured to the vehicle, said base member formed with a central circular recess from which a passage extends, a lock disc rotatable in said recess and formed with a peripheral slot and a peripheral recess in spaced relation, a king pin projecting downwardly from the semi-trailer for entrance into the peripheral slot in the disc through the passage in the base, a spring-pressed bolt adapted to engage in the peripheral recess in the disc to lock the latter after it is rotated by the king pin, a hand-operated member for withdrawing said bolt from the recess in the disc, a fulcrumed lever projected over the disc, a spring secured to one end of said lever for forcing its other end in the path of inward movement of the bolt, and a release pin on said disc for engagement with said lever, to withdraw the latter from engagement with the bolt, after the disc has been rotated a sufficient distance to move its bolt-receiving recess beyond the bolt.

GEORGE WALTHER.
ELMER L. MILLER.